United States Patent [19]
Edamura et al.

[11] Patent Number: 5,705,969
[45] Date of Patent: Jan. 6, 1998

[54] ACTUATOR

[75] Inventors: Kazuya Edamura, Tokyo; Yasufumi Otsubo, Chiba, both of Japan

[73] Assignee: Fujikura Kasei Co., Ltd., Tokyo, Japan

[21] Appl. No.: 506,931

[22] Filed: Jul. 26, 1995

[30] Foreign Application Priority Data

| Jul. 27, 1994 | [JP] | Japan | 6-175872 |
| Dec. 9, 1994 | [JP] | Japan | 6-306699 |
| Mar. 2, 1995 | [JP] | Japan | 7-043308 |

[51] Int. Cl.$^6$ ............................................. H01F 7/08
[52] U.S. Cl. .................. 335/228; 267/64.15; 251/16; 335/231
[58] Field of Search ........................ 188/267, 299; 267/64.15, 64.25, 64.35, 140.1, 225; 280/707; 251/16; 91/31; 335/228, 231

[56] References Cited

U.S. PATENT DOCUMENTS

| 4,601,231 | 7/1986 | Shimoda | 92/122 |
| 4,981,286 | 1/1991 | Kato et al. | 188/267 |
| 5,374,367 | 12/1994 | Edamura et al. | |

FOREIGN PATENT DOCUMENTS

| 0 150 994 A1 | 8/1985 | European Pat. Off. |
| 0 478 034 A1 | 4/1992 | European Pat. Off. |
| 0 588 482 A2 | 3/1994 | European Pat. Off. |
| 0 588 482 A3 | 3/1994 | European Pat. Off. |
| 6-57274 | 3/1994 | Japan. |
| 6-73390 | 3/1994 | Japan. |
| 2 236 761 | 4/1991 | United Kingdom. |

OTHER PUBLICATIONS

Yasufuku et al., "Electric Conduction Phenomena and Carrier Mobility Behavior in Dielectric Fluids", IEEE Trans. Electr. Insul., EI–14(1):28–35 (1979).

A. Castellanos, "Coulomb–driven Convection in Electrohydrodynamics", IEEE Transactions on Electrical Insulation 26(6):1201–1215 (1991).

A. Yabe et al., "Augmentation of Convective and Boiling Heat Transfer by Applying an Electro–Hydrodynamical Liquid Jet", Int. J. Heat Mass Transfer, 31(2):407–417 (1988).

T. Maekawa et al., "Study on EHD Convection", Experimental Heat Transfer, Fluid Mechanics and Thermodynamics, pp. 164–171 (1993).

*Primary Examiner*—Lincoln Donovan
*Attorney, Agent, or Firm*—Finnegan, Henderson, Farabow, Garrett & Dunner, L.L.P.

[57] ABSTRACT

An actuator for converting electrical energy into rotary or reciprocating motion comprising a casing filled with an electro-sensitive fluid, the casing having a plurality of electrodes affixed along its inner periphery and including a rotary member which is impelled by the flow of the electro-sensitive fluid when DC voltage is applied to the electrodes.

6 Claims, 3 Drawing Sheets

ACTUATOR

BACKGROUND OF THE INVENTION

1. Field of the Invention

The invention relates to an actuator which converts electrical energy into rotary or reciprocating motion, in which an electro-sensitive fluid is employed as an operating fluid.

2. Background Art

Oil hydraulic motors, oil hydraulic cylinders, air motors, and air cylinders have been known as actuators in which an operating fluid is employed. These actuators convert energy in a compressed oil or a compressed air into rotary or reciprocating motion.

On the other hand, an electro-sensitive fluid is a fluid in which physical properties, such as viscosity and optical properties, are varied by means of the application of a voltage. Typical electro-sensitive fluids are liquid crystal compounds and electrorheological fluids. Liquid crystal compounds vary their optical properties by the application of a voltage, while electrorheological fluids vary their viscosity thereby.

However, no actuator in which an electro-sensitive fluid is employed as an operating fluid, and which converts electrical energy into rotary or reciprocating motion or the like by the application of a voltage has hitherto been known.

SUMMARY OF THE INVENTION

The object of the present invention is to provide a novel actuator in which an electro-sensitive fluid is employed as an operating fluid.

The above object can be solved by structuring an actuator so as to comprise: a casing; a plurality of electrodes which are provided with the casing; an operating fluid contained in the casing, comprising an electro-sensitive fluid which generates a flow of the operating fluid by means of a DC voltage applied to the electrodes; and a movable member for deriving motive power which is impelled by the flow of the operating fluid. According to the construction of this actuator, when a DC voltage is applied to the electrodes, the operating fluid flows, and the movable member is thereby impelled by the flow of the operating fluid.

In addition, in order to derive rotary motion, the actuator according to the above aspect of the present invention is provided in which the casing is a cylinder having an inner circumferential wall, a plurality of the electrodes are provided with the inner circumferential wall, and the movable member is a turbine rotor which is impelled to rotate by the flow of the operating fluid. When a DC voltage is applied to the electrodes of this actuator, the operating fluid flows, and the rotor is thereby impelled to rotate by the flow of the operating fluid.

As the electro-sensitive fluid, a composition comprising an organic fluorine compound and an electrically insulating medium may be preferably used.

According to the present invention, a novel actuator can be obtained in which an electro-sensitive fluid is employed as an operating fluid, and which can convert electrical energy into rotary or reciprocating motion.

DESCRIPTION OF THE PREFERRED EMBODIMENTS

The present invention will be explained in more detail in the following.

Figure 1:
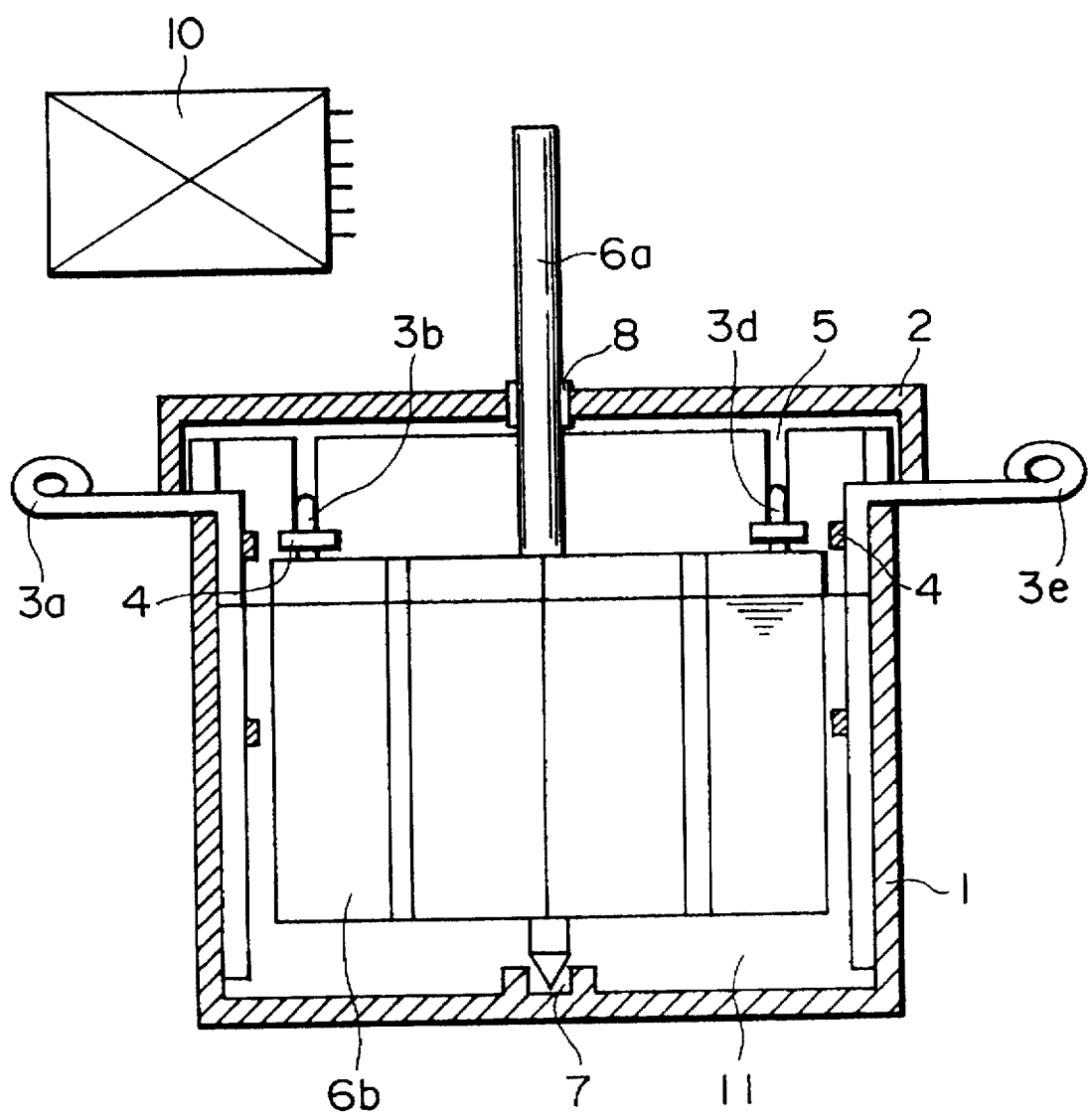
FIG. 1 is a schematic structural view showing an embodiment of an actuator of the present invention.
Figure 2:
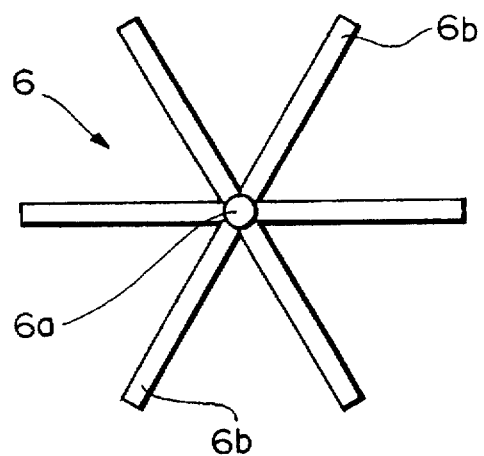
FIG. 2 is a plan view showing a rotor for the actuator shown in FIG. 1.
Figure 3:
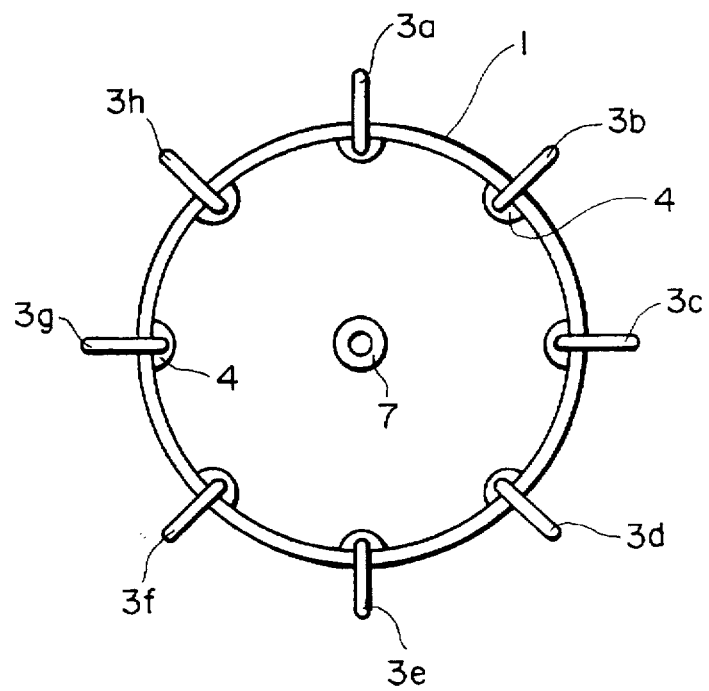
FIG. 3 is a plan view showing an arrangement of electrodes for the actuator shown in FIG. 1.

FIGS. 1 to 3 illustrate an embodiment of an actuator of the present invention, which is a type of a motor used in order to derive rotary motion.

As shown in the figures, a casing 1, which is made of an electrically insulating material, and which is in the form of a cylinder having a bottom and an opening, is provided with a lid 2 in such a manner as to close the opening. In addition, the casing 1 is provided on its inner circumferential wall with eight electrodes 3a, 3b, 3c, 3d, 3e, 3f, 3g, and 3h at regular intervals as shown in FIG. 3.

The electrodes 3a–3h are in a wire-like shape which may be made of iron, copper, aluminum, or the like. Each of the electrodes 3a–3h is provided in such a manner that it is inserted through one of the electrode-supporting parts 4 which project from the inner circumferential wall of the casing 1, and then each of the electrodes 3a–3h is attached to the surface of the inner circumferential wall. In addition, each of the electrodes 3a–3h is bent in an L-shape at the upper portion, extends outside of the casing 1 through one of slits 5 which are formed in the upper portion of the casing 1, and is bent in the shape of a ring at the end.

In addition, the casing 1 is provided therein with a turbine rotor 6. The rotor 6 consists of a rotor shaft 6a and six blades 6b which are provided around the rotor shaft 6a at equal angles. The lower end of the rotor shaft 6a, which is in the shape of a needle head, is pivotally supported by a pivot bearing 7 which is formed in the center of the bottom of the casing 1. The upper portion of the rotor shaft 6a extends upward from the casing 1 through a bearing 8 which is provided in the center of the lid 2.

Furthermore, the electrodes 3a–3h are electrically connected to a DC electric power source 10 by means of lead wires (which are not shown in the figures). The DC electric power source 10 can output a DC voltage of approximately 0.5 to 10 kV. The DC electric power source 10 has an automatic switching function which switches the application of the output DC voltage from one of the electrodes 3a–3h to the next in regular succession and automatically.

Moreover, the casing 1 is filled with an electro-sensitive fluid 11 up to approximately a level which is above the rotor 6 and the blades 6b. As the electro-sensitive fluid 11, ones described in Japanese Patent Applications, First Publications, Laid Open Nos. 6-57274 and 6-73390 (which are bases for the priority of U.S. Pat. No. 5,374,367 and European Patent Application No. 93306221.8) are preferably used.

Examples of electro-sensitive fluids described in the above references comprise one of the organic fluorine compounds indicated in the following formulas (I) through (IV), and an electrically insulating medium:

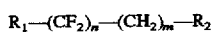  (I)

in which:

$R_1$ indicates H, F, Cl, Br, or I;

n indicates an integer within a range of 3–30;

m indicates an integer within a range of 0–2; and $R_2$ indicates $CH_2OH$; $COOH$; $COOM$, M indicating an alkali metal or a primary to quaternary ammonium; or $CH_2SH$;

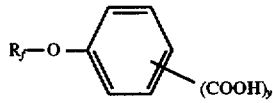

(II)

in which, $R_f$ indicates $C_{3x}F_{6x-1}$;

x indicates an integer within a range of 2–4; and y indicates an integer within a range of 1–3;

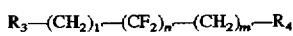

(III)

in which:

$R_3$ indicates $CH_2OH$; $COOH$; $COOM$, M indicating an alkali metal or a primary to quaternary ammonium; or $CH_2SH$;

$R_4$ indicates $CH_2OH$; $COOH$; $COOM$, M indicating an alkali metal or a primary to quaternary ammonium; or $CH_2SH$;

l' indicates an integer within a range of 0–2;

m' indicates an integer within a range of 0–2; and n' indicates an integer within a range of 2–20; and

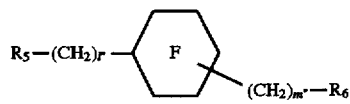

(IV)

in which:

$R_5$ indicates $CH_2OH$; $COOH$; $COOM$, M indicating an alkali metal or a primary to quaternary ammonium; or $CH_2SH$;

$R_6$ indicates $CH_2OH$; $COOH$; $COOM$, M indicating an alkali metal or a primary to quaternary ammonium; or $CH_2SH$;

l" indicates an integer within a range of 0–2; and m" indicates an integer within a range of 0–2.

Concrete examples of the compounds indicated by the above formula (I) include:

$F(CF_2)_8CH_2CH_2OH$: 2-(perfluorooctyl)ethanol;

$F(CF_2)_{10}CH_2CH_2OH$: 2-(perfluorodecyl)ethanol;

$F(CF_2)_{2a}CH_2CH_2OH$: "Cm alcohol", produced by Asahi Glass Co., Ltd. (in which "a" represents an integer ranging from 3–8);

$F(CF_2)_9CH_2OH$: perfluorononylmethanol;

$F(CF_2)_8COOH$: perfluorononanoic acid;

$H(CF_2)_8CH_2OH$: 1H,1H,9H-hexadecafluorononanol $H(CF_2)_8COOH$: 9H-hexadecafluorononanoic acid;

$F(CF_2)_7COOH$: perfluorooctanoic acid; and $F(CF_2)_{17}COOH$: perfluorostearic acid; etc.

Concrete examples of the compounds indicated by the above formula (II) include compounds indicated by the following formulas (A) and (B):

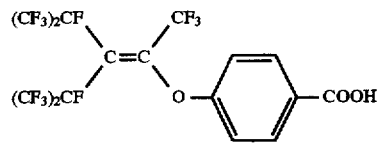

(A)

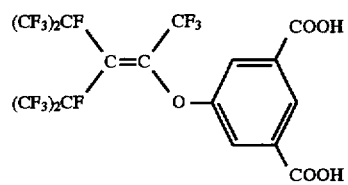

(B)

Concrete examples of the compounds indicated by the above formula (III) include:

$HOOC(CF_2)_2COOH$,
$HOOC(CF_2)_3COOH$,
$HOOC(CF_2)_6COOH$,
$HOOC(CF_2)_8COOH$,
$HOCH_2(CF_2)_3CH_2OH$,
$HOCH_2(CF_2)_6CH_2OH$, and
$HOCH_2(CF_2)_8CH_2OH$, etc.

Concrete examples of the compounds indicated by the above formula (IV) include compounds indicated by the following formulas (C), (D), and (E):

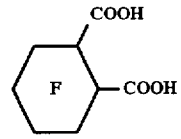

(C)

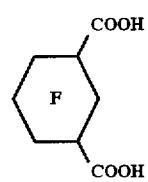

(D)

(E)

etc.

It is possible to use these organic fluorine compounds (I) to (IV) individually, or to use two or more of such compounds in a mixture.

The electrically insulating medium is a medium possessing electrically insulating properties and which is capable of dissolving partially, if not completely, the above organic fluorine compounds when a voltage is applied thereto. This type of solvent possesses the characteristic of solvating the fluorine compounds at the application of a voltage.

Examples of such an electrically insulating medium include silicone oil, sebacic esters, trimellitic esters, partially hydrated triphenyl, phosphazene oil, adipic esters, phthalic esters, aliphatic carboxylic esters such as vegetable oils or the like, higher alkyl esters of aromatic polycarboxylic acids, aliphatic hydrocarbons such as refined kerosene and the like, alkylated aromatic hydrocarbons, halogenated aliphatic or aromatic hydrocarbons, fluorooils, fluorocarbons, fluorosilicone oils, ethers, phosphazenes, and the like; these may be used singly or in a mixture of two or more of the above.

The mixing proportions of the fluorine compounds indicated in formulas (I) to (IV) above with respect to the electrically insulating medium should preferably be within a range of 0.1–35% by weight, and more preferably within a range of 1–15% by weight.

The electro-sensitive composition can be manufactured by simply combining the organic fluorine compound indicated in formulas (I) to (IV) above and the electrically insulating medium, and sufficiently agitating the mixture at room temperature.

The way in which an actuator according to the above embodiment functions will be explained in the following.

The rotor 6 rotates basically by means of applying a DC voltage supplied from a DC electric power source 10 to a plurality of the electrodes 3a–3h. Concrete examples of the voltage-application method are as follows.

A first voltage-application method is carried out by applying a DC voltage in such a manner, for example, referring to FIG. 3, that the electrode 3a and the electrode 3e (the electrode 3e being located at a position in the plane angle of 180° with respect to the electrode 3a) are positive electrodes, and that the rest of the electrodes are grounded (i.e., negative electrodes).

This first voltage-application method is characterized in that a voltage is applied in such a manner that two fixed electrodes are, for example, positive electrodes, and the remaining six electrodes are grounded to be negative electrodes. When this is the case, a straight-polarity DC electric power source applies a positive charge to the positive electrodes, and the grounded electrodes become relatively negative electrodes. When a reversed-polarity DC power source is used instead, which applies a negative charge, the two fixed electrodes to which a negative charge applies become negative electrodes, and the grounded electrodes become relatively positive electrodes.

Modified examples of the first voltage-application method are, for example: a method in which a voltage is applied in such a manner that the electrode 3a and the electrode 3d (the electrode 3d being located at a position in the plane angle of 135° with respect to the electrode 3a) are positive electrodes, and that the rest of the electrodes are grounded; and a method in which a voltage is applied in such a manner that the electrode 3a and the electrode 3c (the electrode 3c being located at a position in the plane angle of 90° with respect to the electrode 3a) are positive electrodes, and that the rest of the electrodes are grounded.

Of course, other combinations of electrodes to which a voltage is applied are also acceptable for the first voltage-application method as long as two electrodes to which a voltage is applied are at the positions in the same plane angle as in the above combinations; such combinations of electrodes are, for example, electrodes 3a and 3f, electrodes 3a and 3g, and electrodes 3b and 3d. However, referring to FIG. 3, any combination of electrodes to which a voltage is applied in which these electrodes are next to each other is not acceptable.

Accordingly, in the first voltage-application method, it is preferred for the rotation of the rotor that the electric field intensity between the two electrodes to which a voltage is applied is relatively high. In order to make this electric field intensity high, a small casing may be used. As a specific example, in the case when a casing 1 in FIG. 1 has an inner diameter of 5 cm, it is desirable that the applied voltage be set to 3 kV or higher, and preferably to 5 kV or higher.

Furthermore, a second voltage-application method is carried out by applying a DC voltage to the eight electrodes 3a–3h in such a manner as by switching the voltage from one of the electrodes 3a–3h to the next in regular succession.

As a concrete example, among the eight electrodes 3a–3h, a voltage is applied to two electrodes 3a and 3e, which are opposite to each other with respect to the rotor shaft 6a of the rotor 6, as positive electrodes. The rest of the electrodes are grounded. With the elapse of a specific period, for example, 1 second, the application of the voltage switches clockwise (referring to FIG. 3), i.e., from the electrode 3a to the adjacent electrode 3b, and from the electrode 3e to the adjacent electrode 3f. The switching of the voltage from the electrode 3e to the electrode 3f lags that from the electrode 3a to the electrode 3b by a specific period, for example, 0.5 seconds. Therefore, the voltage is applied to the electrode 3e for a longer period, for example, for 0.5 seconds longer, than to the electrode 3a.

After the voltage is applied to the electrodes 3b and 3f for a specific period, for example, 1 second, the application of the voltage switches from the electrode 3b to the electrode 3c, and from the electrode 3f to the electrode 3g. Since the previous switching from the electrode 3e to the electrode 3f lagged, the switching from the electrode 3f to the electrode 3g also lags in the same manner.

Figure 4:
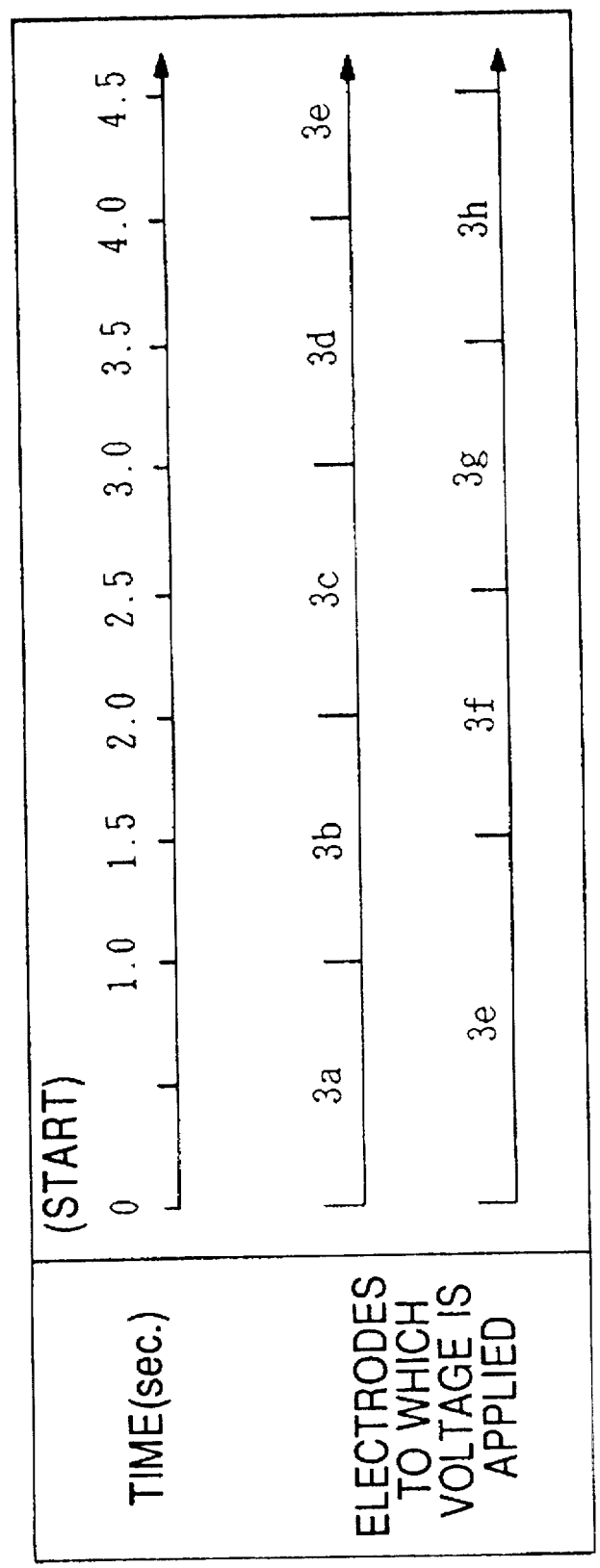
FIG. 4 is a timing chart for explaining an example of a second method for applying a voltage to electrodes in an actuator of the present invention.

Thus, as shown in the timing chart in FIG. 4, switching of the application of a voltage does not occur with two electrodes simultaneously, but switching of the application of a voltage to one of the two electrodes lags the other by a specific period, for example, 0.5 seconds. Subsequently, the application of the voltage is proceeded in the same manner, by switching it from one of the electrodes 3a–3h to the next in regular succession. In any case, the electrodes, other than two of those to which a voltage is applied, are grounded.

In this second voltage-application method, the rotor 6 can rotate even with a relatively low electric field intensity between the two electrodes to which a voltage is applied. Thus, a voltage to be applied may be 2 kV or less. Accordingly, the second voltage-application method is desirable in the case when a high voltage cannot be applied, or when the casing 1 is large.

The electro-sensitive fluid 11 flows by the above-described application of a voltage to a plurality of the electrodes 3a–3h, and then the rotor 6 rotates by this flow.

Accordingly, rotary motion can be derived from the rotor shaft 6a of the rotor 6, which thus functions as an actuator.

In addition, the direction of rotation can be controlled by adjusting the plane arrangement of a plurality of the electrodes 3a–3h (which may be positive or negative). That is to say, when the electro-sensitive fluid flows from a positive electrode to a negative electrode, a rotor 6 turns in the same direction.

According to this type of actuator, electrical energy, which is given as a voltage applied to a plurality of the electrodes 3a–3h, is converted into rotary motion of the rotor 6, and thus, motive power can be derived. Such an actuator in which an electro-sensitive fluid is employed as an operating fluid has not been hitherto known and was first developed by the present inventors.

According to the above concrete embodiments, eight electrodes were employed; however, any other number of electrodes, which is equal to or greater than two, may also be employed. The number of blades of a rotor is also not limited as long as it is equal to or greater than two. In addition, the number of electrodes does not have to correspond particularly to the number of blades.

In addition, the rotation speed can be varied by employing another voltage-application method.

Furthermore, an actuator of the present invention is not limited to a rotary machine as described above; an actuator may be provided which comprises: a cylinder; a piston which is provided in the cylinder; an electro-sensitive fluid which is filled in the cylinder; a plurality of electrodes, each of which is in the shape of a ring and which are aligned within the inner wall of the cylinder; and a flow channel for recovering the electro-sensitive fluid. According to this actuator, the piston can make reciprocating motion by applying a voltage to the electrodes in such a manner as by switching the application of the voltage from one of the electrodes to the next in regular succession.

Experimental Example 1

An actuator as illustrated in FIGS. 1–3 was constructed. However, as a rotor 6, one provided with eight blades at equal angles was used.

An electro-sensitive fluid in which 5% by weight of a fluorine compound as indicated in the above formula (A), which is encompassed by compounds indicated by the general formula (II), is incorporated into one of the following four electrically insulating media (A, B, C, and D), and was filled in a casing 1 having a capacity of approximately 60 ml.

Electrically insulating media:

A: Silicone oil ("TSF451-100", produced by Toshiba Silicone Co., Ltd.)

B: Dioctyl sebacate ("DOS", produced by Kyowa Hakko Kogyo Co., Ltd.)

C: Fluorocarbon ("Fluorinert FC-43", produced by Sumitomo 3M Co., Ltd.)

D: Partially hydrated triphenyl ("Therm-S-900", produced by Nippon Steel Chemical Co., Ltd.)

A DC with a voltage of 5.0 kV was applied to electrodes 3a and 3e as positive electrodes. The rest of the electrodes were grounded to be negative electrodes. As a result, rotation of the rotor 6 in every electro-sensitive fluid started immediately upon the application of the voltage, and continued during the application of the voltage. Relationships between the electrically insulating media and the rotation speeds are shown in Table 1. The value of the electric current during the application of the voltage in each case was under 0.05 mA, which is the lowest measurable limit for the galvanometer used.

TABLE 1

| Electrically insulating material | A | B | C | D |
|---|---|---|---|---|
| Rotation speed (seconds/rotation) | 22.3 | 6.5 | 7.3 | 182.6 |

Experimental Example 2

Application of a voltage was conducted under the same conditions as in Experimental Example 1, except that the silicone oil A was used as an electrically insulating medium, and that electrodes 3a and 3d were used as electrodes. As a result, rotation of the rotor 6 started immediately upon the application of the voltage, and continued at a speed of 16 seconds/rotation during the application of the voltage. The value of the electric current during the application of the voltage was under 0.05 mA.

Experimental Example 3

Application of a voltage was conducted under the same conditions as in Experimental Example 1, except that the silicone oil A was used as an electrically insulating medium, and that electrodes 3a and 3c were used as electrodes. As a result, rotation of the rotor 6 started immediately upon the application of the voltage, and continued at a speed of 20 seconds/rotation during the application of the voltage. The value of the electric current during the application of the voltage was under 0.05 mA.

Experimental Example 4

Application of a voltage was conducted under the same conditions as in Experimental Example 1, except that the silicone oil A was used as an electrically insulating medium, and that as a rotor 6, one provided with four blades at equal angles was used. As a result, rotation of the rotor 6 started immediately upon the application of the voltage, and continued at a speed of 16 seconds/rotation during the application of the voltage. The value of the electric current during the application of the voltage was under 0.05 mA.

Experimental Example 5

An actuator as illustrated in FIGS. 1–3 was constructed. As a rotor 6, one provided with six blades at equal angles was used. An electro-sensitive fluid of the same type as that used in Experimental Example 2 was also used in this experimental example. A DC with a voltage of 2.0 kV was applied, according to the second voltage-application method, to the eight electrodes 3a–3h in such a manner as by switching the voltage from one of the electrodes 3a–3h to the next in regular succession. The timing chart shown in FIG. 4 was adopted for the application of the voltage, in which the duration of the application of the voltage to one electrode was set to 1 second, except that the duration of the first application of the voltage to the electrode 3a was set to 1.5 seconds. As a result, the rotor 6 continued rotating at a speed of 24 seconds/rotation.

Experimental Example 6

Relationships between electrically insulating media and the rotation speeds were observed under the same conditions as in Experimental Example 1, except that F-$(CF_2)_8$—$CH_2CH_2OH$ ("A-1820", produced by Daikin Fine Chemical Laboratory), which is encompassed by compounds indicated by the general formula (I), was used instead of the fluorine compound of formula (A) which was used in Experimental Example 1. The results are shown in Table 2. The value of the electric current during the application of the voltage in each case was under 0.05 mA, which is the lowest measurable limit for the galvanometer used.

TABLE 2

| Electrically insulating material | A | B | C | D |
|---|---|---|---|---|
| Rotation speed (seconds/rotation) | 20.4 | 6.1 | 6.8 | 23.9 |

Experimental Example 7

Relationships between electrically insulating media and the rotation speeds were observed under the same conditions as in Experimental Example 1, except that HOOC—$(CF_2)_6$—COOH (produced by Idemitsu Petrochemical Co., Ltd.), which is encompassed by compounds indicated by the general formula (III), was used instead of the fluorine compound of formula (A) which was used in Experimental Example 1. The results are shown in Table 3. The value of the electric current during the application of the voltage in each case was under 0.05 mA, which is the lowest measurable limit for the galvanometer used.

TABLE 3

| Electrically insulating material | A | B | C | D |
|---|---|---|---|---|
| Rotation speed (seconds/rotation) | 21.7 | 6.4 | 7.5 | 66.2 |

Experimental Example 8

Relationships between electrically insulating media and the rotation speeds were observed under the same conditions as in Experimental Example 1, except that a compound indicated by the above formula (E) (produced by Idemitsu Petrochemical Co., Ltd.), which is encompassed by compounds indicated by the general formula (iV), was used instead of the fluorine compound of formula (A) which was used in Experimental Example 1. The results are shown in Table 4. The value of the electric current during the application of the voltage in each case was under 0.05 mA, which is the lowest measurable limit for the galvanometer used.

TABLE 4

| Electrically insulating material | A | B | C | D |
|---|---|---|---|---|
| Rotation speed (seconds/rotation) | 60.7 | 7.9 | 196.4 | 82.5 |

Experimental Example 9

A rotation speed at the applied voltage of 5.0 kV was measured in a manner similar to Experimental Example 1 by using an electro-sensitive fluid in which 3% by weight of $HOCH_2-(CF_2)_8-CH_2OH$, which is encompassed by compounds indicated by the general formula (III), was incorporated into the silicone oil of the same type as that used in Experimental Example 1. The measured rotation speed was 72.8 seconds/rotation. The value of the electric current during the application of the voltage was under 0.05 mA, which is the lowest measurable limit for the galvanometer used.

Experimental Example 10

A rotation speed at the applied voltage of 5.0 kV was measured in a manner similar to Experimental Example 1 by using an electro-sensitive fluid in which 3% by weight of $F-(CF_2)_{2a}-CH_2CH_2OH$ (which is a mixture in which "a" represents integers ranging from 3–8; "Cm alcohol", produced by Asahi Glass Co., Ltd.), which is encompassed by compounds indicated by the general formula (I), was incorporated into the silicone oil of the same type as that used in Experimental Example 1. The measured rotation speed was 78.6 seconds/rotation. The value of the electric current during the application of the voltage was under 0.05 mA, which is the lowest measurable limit for the galvanometer used.

Experimental Example 11

An electro-sensitive fluid in which 5% by weight of a fluorine compound, of the same type as that used in Experimental Example 1, was incorporated into electrically insulating medium B, was filled in a casing 1 having a capacity of approximately 60 ml.

The rotation speed and rotation direction of the rotor 6 during the application of the voltage were observed by employing a rotor 6 provided with 8 blades, removing electrodes 3c, 3d, 3g and 3h from the casing 1, and applying a DC with a voltage of 5.0 kV in a manner such that electrodes 3a and 3e are positive electrodes, and such that electrodes 3b and 3f are grounded to be negative electrodes. The results are shown in Table 5.

In addition, the rotation speed and rotation direction of the rotor 6 during the application of the voltage were observed by using electrodes 3d and 3h as negative electrodes, instead of electrodes 3b and 3f. The results are also shown in Table 5.

The value of the electric current during the application of the voltage in either case was under 0.05 mA, which is the lowest measurable limit for the galvanometer used.

TABLE 5

| Positive electrodes | Negative electrodes | Rotation direction | Rotation speed (sec./rotation) |
|---|---|---|---|
| 3a and 3e | 3b and 3f | Clockwise | 7.2 |
| 3a and 3e | 3d and 3h | Counterclockwise | 7.6 |

We claim:

1. An actuator comprising: a casing; a plurality of electrodes which are provided with said casing; an operating fluid contained in said casing, comprising an electro-sensitive fluid which generates a flow of said operating fluid by means of a DC voltage applied to said electrodes, said electro-sensitive fluid comprising an organic fluorine compound and an electrically insulating medium; and a movable member for deriving motive power which is impelled by said flow of said operating fluid.

2. An actuator according to claim 1, wherein said casing is a cylinder having an inner circumferential wall, a plurality of said electrodes provided within said inner circumferential wall, and said movable member comprises a turbine rotor which is impelled to rotate by said flow of said operating fluid.

3. An actuator according to claim 2, wherein at least two electrodes among a plurality of said electrodes are electrically connected to a DC electric power source, and at least one electrode among a plurality of said electrodes is positioned between any two of said electrodes electrically connected to said DC electric power source.

4. An actuator according to claim 2, wherein said actuator further comprises a switching means electrically connected between a plurality of said electrodes and a DC electric power source, said switching means switching application of said DC voltage from one of said electrodes to the next in regular succession.

5. An actuator according to claim 1, wherein said organic fluorine compound is selected from the group consisting of:

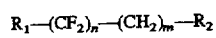

wherein:

$R_1$ indicates H, F, Cl, Br, or I;

n indicates an integer within a range of 3–30;

m indicates an integer within a range of 0–2; and $R_2$ indicates $CH_2OH$; COOH; COOM, M indicating an alkali metal or a primary to quaternary ammonium; or $CH_2SH$;

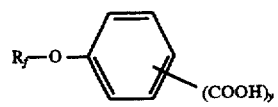

wherein:

$R_f$ indicates $C_xF_{6x-1}$;

x indicates an integer within a range of 2–4; and y indicates an integer within a range of 1–3;

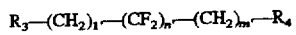

wherein:

$R_3$ indicates $CH_2OH$; COOH; COOM, M indicating an alkali metal or a primary to quaternary ammonium; or $CH_2SH$;

$R_4$ indicates $CH_2OH$; COOH; COOM, M indicating an alkali metal or a primary to quaternary ammonium; or $CH_2SH$;

l' indicates an integer within a range of 0–2;

m indicates an integer within a range of 0–2; and n' indicates an integer within a range of 2–20; and

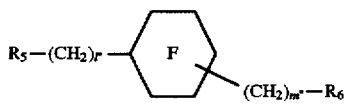

wherein:

$R_5$ indicates $CH_2OH$; COOH; COOM, M indicating an alkali metal or a primary to quaternary ammonium; or $CH_2SH$;

$R_6$ indicates $CH_2OH$; COOH; COOM, M indicating an alkali metal or a primary to quaternary ammonium; or $CH_2SH$;

l" indicates an integer within a range of 0–2; and m" indicates an integer within a range of 0–2.

6. An actuator according to claim 1, wherein said electrically insulating medium is selected from the group consisting of silicone oil, sebacic esters, trimellitic esters, partially hydrated triphenyl, phosphazene oil, adipic esters, phthalic esters, aliphatic carboxylic esters, higher alkyl esters of aromatic polycarboxylic acids, aliphatic hydrocarbons, alkylated aromatic hydrocarbons, halogenated aliphatic or aromatic hydrocarbons, fluorooils, fluorocarbons, fluorosilicone oils, ethers, and phosphazenes.

* * * * *